United States Patent
Quinn

(10) Patent No.: US 11,193,227 B2
(45) Date of Patent: Dec. 7, 2021

(54) VOLTAGE DOUBLING CIRCUIT FOR LAUNDRY TREATING APPLIANCE WITH HIGH POWER VARIABLE FREQUENCY DRIVE

(71) Applicant: WHIRLPOOL CORPORATION, Benton Harbor, MI (US)

(72) Inventor: Daniel Quinn, Fall River, MA (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 17/031,981

(22) Filed: Sep. 25, 2020

(65) Prior Publication Data

US 2021/0057994 A1 Feb. 25, 2021

Related U.S. Application Data

(63) Continuation of application No. 16/714,842, filed on Dec. 16, 2019, now Pat. No. 10,811,964, which is a
(Continued)

(51) Int. Cl.

| | |
|---|---|
| *F04D 15/00* | (2006.01) |
| *H02K 7/14* | (2006.01) |
| *D06F 34/08* | (2020.01) |
| *H02M 3/07* | (2006.01) |
| *H02M 1/32* | (2007.01) |
| *H02P 27/04* | (2016.01) |
| *H02M 1/10* | (2006.01) |
| *D06F 37/30* | (2020.01) |
| *D06F 34/10* | (2020.01) |

(52) U.S. Cl.
CPC ............. *D06F 34/08* (2020.02); *H02M 1/10* (2013.01); *H02M 1/32* (2013.01); *H02M 3/073* (2013.01); *H02P 27/04* (2013.01); *D06F 34/10* (2020.02); *D06F 37/304* (2013.01); *H02P 2201/09* (2013.01)

(58) Field of Classification Search
CPC ........... D06F 34/08; H02M 1/10; H02M 1/32; H02M 3/073; H02P 27/04
USPC .......................................................... 318/3
See application file for complete search history.

(56) References Cited

U.S. PATENT DOCUMENTS

| | | | |
|---|---|---|---|
| 6,066,928 A | 5/2000 | Kinoshita et al. | |
| 8,723,089 B2* | 5/2014 | Sadakata | H05B 6/062 |
| | | | 219/660 |

(Continued)

FOREIGN PATENT DOCUMENTS

| | | |
|---|---|---|
| DE | 4305477 A1 | 8/1994 |
| EP | 2781640 A1 | 9/2014 |

(Continued)

*Primary Examiner* — Erick D Glass
(74) *Attorney, Agent, or Firm* — McGarry Bair PC

(57) ABSTRACT

A circuit that increases input voltage to higher output voltage connected to a variable frequency drive in an appliance. Several switching arrangements, timing, and safety mechanisms are in place to assist. When the circuit experiences high draw, high voltage output values of circuit decrease over time, but different aspects of the circuit can be constructed so that the amount of time required at a higher voltage does not exceed the amount of time in which the high voltage output is provided.

20 Claims, 5 Drawing Sheets

Related U.S. Application Data continuation of application No. 15/946,140, filed on Apr. 5, 2018, now Pat. No. 10,541,607.

(60) Provisional application No. 62/510,026, filed on May 23, 2017.

(56) References Cited

U.S. PATENT DOCUMENTS

2008/0265819 A1    10/2008   Chen et al.
2015/0028016 A1     1/2015   Cecco et al.

FOREIGN PATENT DOCUMENTS

| | | |
|---|---|---|
| EP | 3095911 A1 | 11/2016 |
| GB | 1499449 A | 2/1978 |
| JP | 2001353396 A | 12/2001 |
| JP | 2008295909 A | 12/2008 |
| JP | 2009278857 A | 11/2009 |

* cited by examiner

VOLTAGE DOUBLING CIRCUIT FOR LAUNDRY TREATING APPLIANCE WITH HIGH POWER VARIABLE FREQUENCY DRIVE

CROSS-REFERENCE TO RELATED APPLICATION

This application is a continuation of U.S. patent application Ser. No. 16/714,842, filed Dec. 16, 2019, now U.S. Pat. No. 10,811,964, issued on Oct. 20, 2020, which is a continuation of U.S. patent application Ser. No. 15/946,140, filed Apr. 5, 2018, now U.S. Pat. No. 10,541,607, issued on Jan. 21, 2020, which claims priority to U.S. Provisional Patent Application No. 62/510,026, filed May 23, 2017, all of which are incorporated herein by reference in their entirety.

BACKGROUND

Laundry treating appliances, such as dryers, clothes washers or washing machines that have a variable frequency drive (VFD), are rated for service with certain electrical power supplies. In certain areas of the world, such as North America, 120 Volts alternating current (VAC) electrical power supplies are prevalent. Smaller appliances with smaller load capacity have a 120 VAC service rating and can operate well using a 120 VAC electrical system, but larger appliances with larger load capacity, such as certain commercial washing machines, require a higher voltage supply, such as 240 VAC, to operate properly.

There is little to no availability for 120 VAC input and 240 VAC output circuitry that can drive VFDs at a high power level (such as greater than 750 Watts). Some existing solutions to this problem of insufficient operating power include using a 120 VAC input variable frequency drive (VFD) and an internal doubling circuit to get a 240 VAC output, but such machines are limited to about 4.2 amps of current, not enough to drive some desired loads in a washing machine. Another solution is to use a very large, heavy, and expensive "step-up" voltage doubling transformer to change from a 120 VAC input to a 240 VAC output.

SUMMARY

In one aspect of the disclosure, a home appliance is configured to perform a cycle of operation, where the home appliance includes a motor, and a voltage doubling circuit, further comprising a power input configured to receive a voltage supply from a power source, at least one capacitor bank connected with the power input, a current-limiting surge suppressor positioned between the power input and the at least one capacitor bank that includes a first current-limiting path and a second bypass path, the second bypass path parallel to the first current-limiting path, and wherein the current-limiting surge suppressor is operable in a first mode where the second bypass path is disabled, and operable in a second mode where the second bypass path is enabled, and wherein the current-limiting surge suppressor switches from the first mode to the second mode when the at least one capacitor bank is charged to a predetermined voltage, a current drain operable to reset the current-limiting surge suppressor from the second mode to the first mode, and a variable frequency drive (VFD) operable in response to a voltage from the at least one capacitor bank greater than the voltage supply from the power source to cause the motor to operate.

DESCRIPTION

Figure 1:
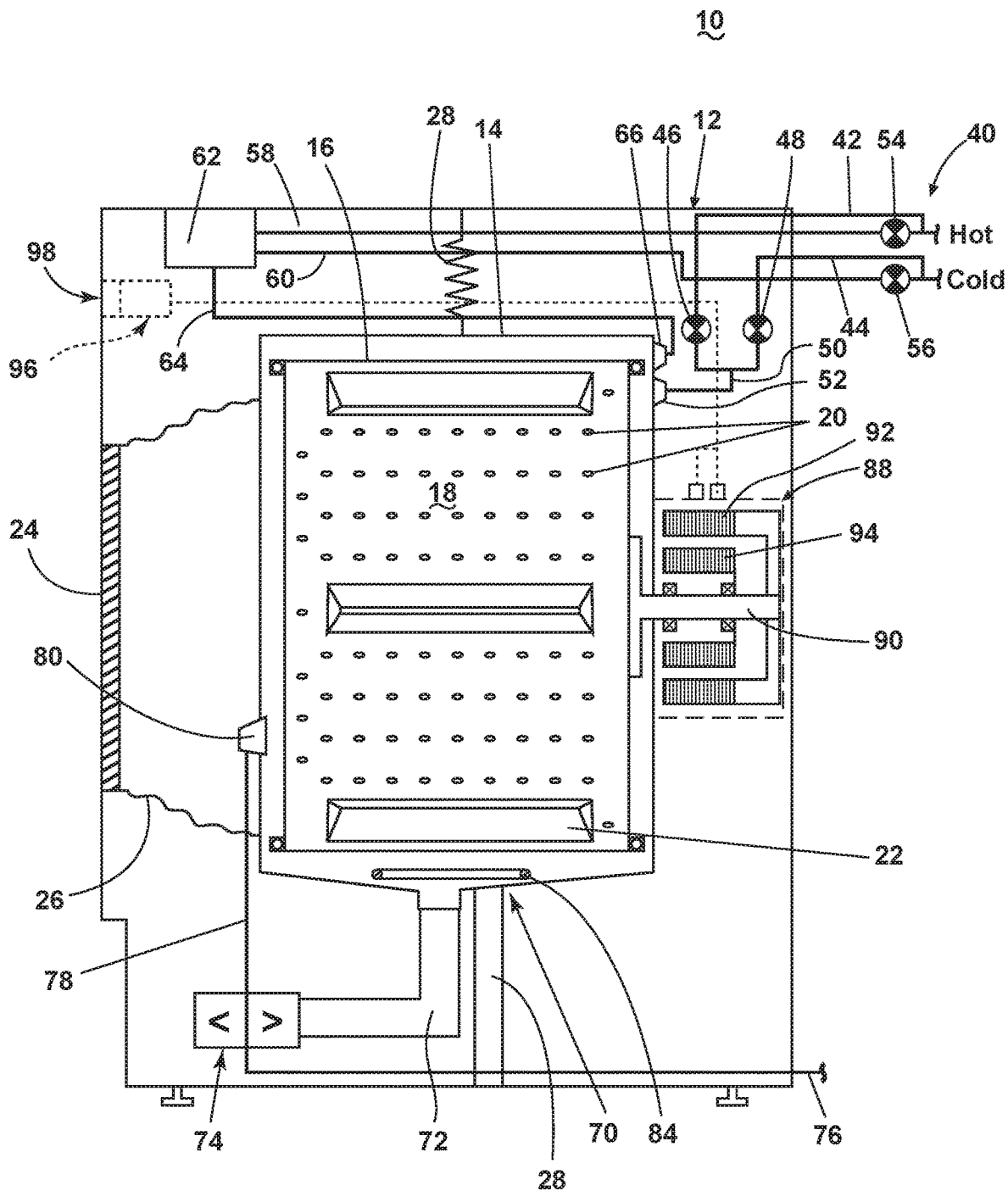
FIG. 1 is a schematic view of a laundry treating appliance in the form of a washing machine according to an aspect of the present disclosure.

Systems, components, and methodologies in accordance with the present disclosure provide a laundry treating appliance with a variable frequency drive (VFD) and a control circuit which doubles the input voltage so that the laundry treating appliance can have a 120 VAC service rating and supply 240 VDC or more to the VFD, perhaps as much as 340 VDC. While 120 VAC is described herein, aspects of the disclosure can be equally applied to any relevant power distribution system, based on geography, power supply limitations, or the like. Thus, aspects of the disclosure can include increasing a voltage to a VFD, as desired.

The control circuit and related systems, components, and methodologies are described herein in relation to a laundry treating appliance in the form of a washing machine or dryer, in the same manner, for treating fabric articles according to a cycle of operation. The washing machine can be a household or commercial appliance. It should be appreciated, however, that the control circuit and related systems, components, and methodologies as described herein are not so limited and can have equal applicability to additional appliances, non-limiting examples of which include a horizontal or vertical axis clothes washer; a dryer; a combination washing machine and dryer; a tumbling or stationary refreshing/revitalizing machine; an extractor; a non-aqueous washing apparatus; and a revitalizing machine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic view of a laundry treating appliance according to one aspect of the present disclosure. The laundry treating appliance of FIG. 1 is illustrated as a washing machine 10, which can include a structural support system comprising a chassis or cabinet 12 which defines a housing within which a laundry holding system resides. The cabinet 12 can be a housing having a chassis or a frame, defining an interior enclosing components typically found in a conventional washing machine, such as motors, pumps, fluid lines, controls, sensors, transducers, and the like. Such components will not be described further herein except as necessary for a complete understanding of the disclosure.

The laundry holding system comprises a tub 14 supported within the cabinet 12 by a suitable suspension system and a drum 16 provided within the tub 14, the drum 16 defining at least a portion of a laundry treating chamber 18. The drum 16 can include a plurality of perforations 20 such that liquid can flow between the tub 14 and the drum 16 through the perforations 20. A plurality of baffles 22 can be disposed on an inner surface of the drum 16 to lift the laundry load received in the treating chamber 18 while the drum 16 rotates. It is also within the scope of the disclosure for the laundry holding system to comprise only a tub with the tub defining the laundry treating chamber.

The laundry holding system can further include a door 24 which can be movably mounted to the cabinet 12 to selectively close both the tub 14 and the drum 16 at an access opening. A bellows 26 can couple the access opening of the tub 14 with the cabinet 12, with the door 24 sealing against the bellows 26 when the door 24 closes the tub 14. Alternatively, a bellows may not be included, and the door 24 can seal directly against the tub 14 when closed.

The washing machine 10 can further include a suspension system 28 for dynamically suspending the laundry holding system within the structural support system.

The washing machine 10 can further include a liquid supply system for supplying water to the washing machine 10 for use in treating laundry during a cycle of operation. The liquid supply system can include a source of water, such as a household or commercial water supply 40, which can include separate hot and cold water supplies, and various conduits 42, 44, 50, 58, 60 and/or valves 46, 48, 54, 56 directing water to areas of the washing machine 10. Water from the water supply 40 can be supplied directly to the tub 14 via a spray nozzle 52 configured to spray a flow of water into the tub 14. Additional conduits and/or valves (not shown) can be provided for controlling the flow of hot and cold water, respectively, to the spray nozzle 52.

The washing machine 10 can also be provided with a dispensing system for dispensing treating chemistry to the treating chamber 18 for use in treating the laundry according to a cycle of operation. The dispensing system can include a treating chemistry dispenser 62. The dispenser 62 can be configured to dispense one or more treating chemistries directly to the tub 14 or one or more treating chemistries mixed with water from the liquid supply system through an outlet conduit 64. The outlet conduit 64 can include a dispensing nozzle 66 configured to dispense the treating chemistry into the tub 14 in a desired pattern and under a desired amount of pressure. For example, the dispensing nozzle 66 can be configured to dispense a flow or stream of treating chemistry into the tub 14 by gravity, i.e. a non-pressurized stream. Additional conduits and/or valves (not shown) can be provided for controlling the flow of hot and cold water, respectively to the dispenser 62. Furthermore, while the dispensing system is shown as filling the tub 14 at the rear of the machine 10, alternatively the dispensing system can fill the tub 14 at the front of the machine 10.

The washing machine 10 can also include a recirculation and drain system for recirculating liquid within the laundry holding system and draining liquid from the washing machine 10. Liquid supplied to the tub 14 typically enters a space between the tub 14 and the drum 16 and can flow by gravity to a sump 70 formed in part by a lower portion of the tub 14. The sump 70 can also be formed by a sump conduit 72 that can fluidly couple the lower portion of the tub 14 to a pump 74. The pump 74 can direct liquid to a drain conduit 76, which can drain the liquid from the washing machine 10, or to a recirculation conduit 78, which can terminate at a recirculation inlet 80. The recirculation inlet 80 can direct the liquid from the recirculation conduit 78 into the drum 16. The recirculation inlet 80 can introduce the liquid into the drum 16 in any suitable manner, such as by spraying, dripping, or providing a steady flow of liquid. In this manner, liquid provided to the tub 14, with or without treating chemistry can be recirculated into the treating chamber 18 for treating the laundry within.

The liquid supply and/or recirculation and drain system can optionally be provided with a heating system which can include one or more devices for heating laundry or liquid supplied to the tub 14, such as a steam generator 82 (FIG. 2) and/or a sump heater 84. Alternatively, the sump heater 84 can be used to generate steam in place of or in addition to the steam generator 82. In addition or alternatively to generating steam, the steam generator 82 and/or sump heater 84 can be used to heat the laundry and/or liquid within the tub 14 as part of a cycle of operation.

Additionally, the liquid supply and recirculation and drain system can differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system can include a motor 88, which can be directly coupled with the rotatable drum 16 through a drive shaft 90 at or about the rear cover to rotate the drum 16 about a rotational axis during a cycle of operation. The motor 88 can be a brushless permanent magnet (BPM) motor having a stator 92 and a rotor 94. Alternately, the motor 88 can be coupled to the drum 16 through a belt and a drive shaft to rotate the drum 16, as is known in the art. Other motors, such as an induction motor or a permanent split capacitor (PSC) motor, can also be used. The motor 88 can rotate the drum 16 at various speeds in either rotational direction.

The washing machine 10 also includes a control system for controlling the operation of the washing machine 10 to implement one or more cycles of operation. The control system can include a controller 96 located within the cabinet 12 and a user interface 98 that is operably coupled with the controller 96. The user interface 98 can include one or more knobs, dials, switches, displays, touch screens and the like for communicating with the user, such as to receive input and provide output. The user can enter different types of information including, without limitation, cycle selection and cycle parameters, such as cycle options.

The controller 96 can include the machine controller and any additional controllers provided for controlling any of the components of the washing machine 10. For example, the controller 96 can include the machine controller and a motor controller. Many known types of controllers can be used for the controller 96. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

Figure 2:
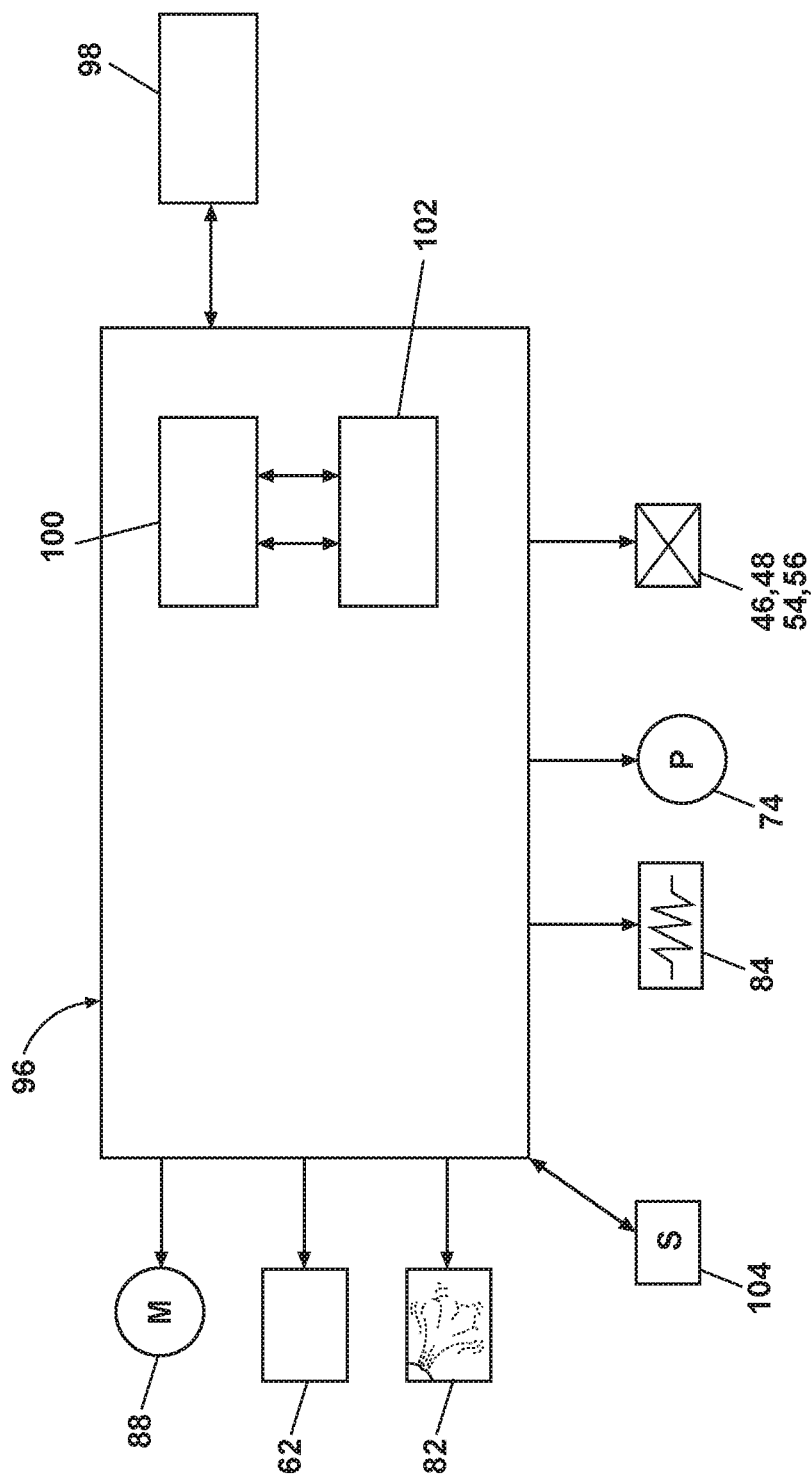
FIG. 2 is a schematic of a control system of the laundry treating appliance of FIG. 1.

As illustrated in FIG. 2, the controller 96 can be provided with a memory 100 and a central processing unit (CPU) 102. The memory 100 can be used for storing the control software that is executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 can also be used to store information, such as a database or table, and to store data received from one or more components of the washing machine 10 that can be communicably coupled with the controller 96. The database or table can be used to store the various operating parameters for the one or more cycles of operation, including factory default values for the operating parameters and any adjustments to them by the control system or by user input.

The controller 96 can be operably coupled with one or more components of the washing machine 10 for communicating with and controlling the operation of the component to complete a cycle of operation. For example, the controller 96 can be operably coupled with the motor 88, the pump 74, the dispenser 62, the steam generator 82, the sump heater 84, or the like, to control the operation of these and other components to implement one or more of the cycles of operation. Other components can include, but are not limited to, valves 46, 48, 54, 56.

The controller 96 can also be coupled with one or more sensors 104 provided in one or more of the systems of the washing machine 10 to receive input from the sensors, which are known in the art and not shown for simplicity. Non-limiting examples of sensors 104 that can be communicably coupled with the controller 96 include: a treating chamber temperature sensor, a moisture sensor, a weight sensor, a chemical sensor, a position sensor, or a motor torque sensor, which can be used to determine a variety of system and laundry characteristics, such as laundry load inertia or mass.

During operation of the washing machine, aspects of the disclosure or controller 96 can operably control, enable, or otherwise causes the motor 88 to rotate the drum 16 at various points, cycle, modes of operations, or the like. For example, during a spin or extraction phase of a cycle of operation, the drum 16 is accelerated to a high number of rotations per minute (RPM) to remove liquid from the clothes load. The voltage required to drive the motor 88 can periodically exceed a normal 120 VAC input supplied from a North American power grid. Such intermittent demands can request, desire, or otherwise demand, for example, 240 VAC.

Figure 3:
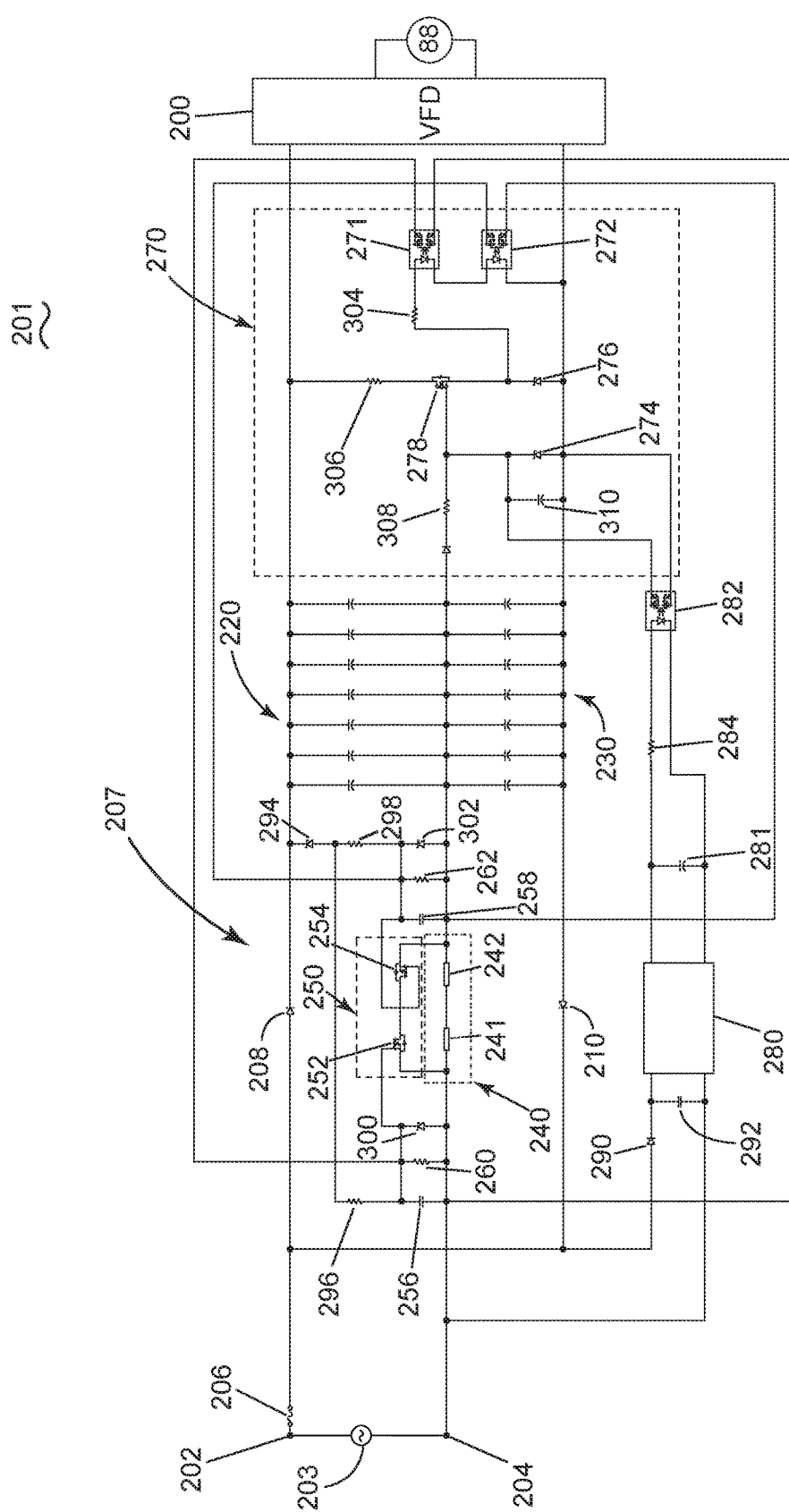
FIG. 3 is a schematic diagram of a voltage doubling circuit in the control system of FIG. 2.

FIG. 3 shows a diagram of a circuit 201, such as a voltage doubling circuit, that outputs DC voltage to a variable frequency drive (VFD) 200, which further operates the motor 88. In one non-limiting example, the circuit 201 or VFD 200 can be one non-limiting example of an aspect configured to operably control, enable, or otherwise cause the motor 88 to operate. In another non-limiting example, the circuit 201 can output a DC voltage that is greater than an AC input voltage supplied to the circuit. Starting from the left of FIG. 3, the circuit 201 includes a 120 VAC input voltage source 203 across a line in 202 and a neutral line 204. The controller can control a contactor, connector, switch, relay, or the like, to enable current to flow to the circuit 201. When the 120 VAC input voltage source 203 is turned ON, current is allowed to flow through a Fuse 206 coupled to the line in 202.

The circuit 201 includes a power module 207 with two diodes 208 and 210 and two banks of capacitors, an upper capacitor bank 220, and a lower bank 230, directly connected to the input of the VFD 200. While "upper" and "lower" capacitive banks 220, 230 are described for ease of understanding, any first capacitor set or bank, and second capacitor set or bank can be included in aspects of the disclosure, regardless or relative positioning to each other. Diodes 208 and 210 can be, but are not limited to, a standard diode array capable of an average rectified current of 30-120 A per diode.

Each capacitor in the upper and lower capacitor banks 220, 230 can be, but is not limited to, a 200 volt capacitor with a capacitance of 1 mF. The upper and lower capacitor banks 220, 230 can be arranged such that the upper capacitor bank 220 (which can include a set of parallel capacitors) is in series with the lower capacitor bank 230 (which can include a different set of parallel capacitors), wherein the distal terminal ends of the respective upper and lower capacitor banks 220, 230 are conductively connected with the line in 202, and the series connection between the upper and lower capacitor banks 220, 230 is conductively connected with the neutral line 204. In this example, the distal terminal ends of the respective upper and lower capacitor banks 220, 230 are further connected with the input of the VFD 200.

The circuit 201 can include a voltage doubling circuit. The power module 207 including diodes 208 and 210 in combination with the upper and lower capacitor banks 220, 230 at least partially to form a full wave voltage doubler. Standard voltage readings; such as the example of the 120 VAC input voltage source 203, are representative of a root mean square (RMS) voltage value. In one non-limiting example, the peak voltage of the 120 VAC input voltage source 203 is approximately 170 VAC. The circuit 201, containing the full wave voltage doubling components rectifies and doubles the 170 VAC from the 120 VAC input voltage source 203 to and output voltage to the VFD 200 of approximately, or up to, 340 VDC.

Control features are included in the circuit 201 to ensure correct operation with the contactor and VFD 200. Control features can include, but are not limited to, a current-limiting surge suppressor 240, a metal-oxide-semiconductor field-effect transistor (MOSFET) bypass 250, and a current drain 270.

The current-limiting surge suppressor 240 can be any current-limiting device. A non-limiting example of the current-limiting surge suppressor 240 can include surge resistors 241 and 242 in series, and arranged in parallel to the MOSFET bypass 250. The surge resistors 241 and 242 can include, but are not limited to, thermistors selected to protect the circuit from sudden increases in current that might be disruptive to operation. The MOSFET bypass 250 can include, but is not limited to field-effect transistors (FETs) 252 and 254 arranged in series, and can be, but are not limited to, n-channel MOSFETS.

The current-limiting surge suppression, by the surge suppressor 240, occurs during periods of time wherein current flows through the surge resistors 241 and 242, operably or effectively charging the upper and lower capacitor banks 220, 230. In one non-limiting example, the period of time can include during an initial period of charging the upper and lower capacitor banks 220, 230. Once the upper and lower capacitor banks 220, 230 are charged to a minimum predetermined voltage value, a MOSFET bypass 250 can be enabled to operably or effectively bypass the surge resistors 241 and 242. The predetermined voltage value corresponds to the voltage threshold of a Zener diode 294.

The MOSFET bypass 250 is triggered by the Zener diode 294. The Zener diode 294 passes current provided by the line in 202 source once the stored energy in the capacitor bank 220 results in a voltage that causes reverse current flow (specified breakdown level) through the Zener diode 294. That current charges capacitors 256 and 258 (associated with, respectively, FETs 252 and 254). Zener diodes have a highly doped p-n junction that prevents the flow of current from the cathode to anode until a voltage threshold (also known as the Zener Voltage) is reached. Once the voltage threshold is reached, current flows from the negative to the positive terminal. In one non-limiting example, the Zener diode 294 can have, but is not limited to, a voltage threshold of 120 VDC, therefore capacitors 256 and 258 do not begin charging until the upper capacitor bank 220, reach a minimum voltage charge of 120 VDC. Thus, the period of initial charge of the upper and lower capacitor banks 220, 230, for example, up to 120 VDC (each), will also coincide with or define the initial period of time that the surge suppressor 240 operably provides current-limiting surge suppression, as described herein.

The capacitors 256 and 258 can be, but are not limited to, 50 volt capacitors with a capacitance of 10 microFarads. Once capacitors 256 and 258 are charged, proper voltage differences will completely open the MOSFET bypass 250. The MOSFET bypass 250 includes FETs 252 and 254. FETs 252 and 254 can be, but are not limited to, a 200 volt MOSFET capable of 130 Amps with typical resistance of 8.0 milliOhms (max. resistance 9.7 milliOhms). Resistors 296 and 298, in respective series with the capacitors 256 and 258, and parallel resistors 260 and 262 can be selected, configured, adapted, or the like, based on considerations including, but not limited to, regulating or defining the timing and activation of FETs 252 and 254 to effectively operate current-limiting surge suppression or to effectively bypass the current-limiting surge suppression.

Once activated, the MOSFET bypass 250 performs as an extremely efficient switch that quickly bypasses the surge resistors 241 and 242. The gate voltage of FETs 252 and 254 are protected by Zener diodes 300 and 302, arranged in parallel, respectively, with capacitors 256 and 258. Zener diodes 300 and 302 can have, but are not limited to, a voltage threshold ("Reverse Breakdown") of 27V.

In one non-limiting example, the upper and lower capacitor banks 220, 230 can be discharged based on loosing input power line in 202 and prior to the next contactor closure. When the 120 VAC input voltage source 203 and current to the circuit 201 are not provided, the FETs 252 and 254 gate signals are reset (to 0V or near 0V); shutting them off and blocking the flow of current though MOSFET bypass 250. This effectively or operably re-enables the current-limiting surge suppressor 240. This discharge results in all components in the circuit ready to start up in the same condition each time.

The current drain 270 control feature can include, but is not limited to, optocouplers 271 and 272, Zener diodes 274 and 276, and FET 278. Optocouplers transmit an electrical signal using a light source that is proportional to the electrical signal. The light source is detected by a photosensitive material which transmits the signal based on the intensity of the light. Optocouplers can connect two separate circuits, while providing electrical isolation to further protect circuit components.

The current drain 270 is connected to the line in 202 and neutral line 204 by way of a voltage regulator 280 in series with another optocoupler 282. When the contactor connects the circuit 201 to the 120 VAC input voltage source 203 current flows through a diode 290 to charge a capacitor 292 across the input of the voltage regulator 280. Diode 290 and capacitor 292 are selected to specifically support the function of the voltage regulator 280. The voltage regulator 280 can be, but is not limited to, a linear regulator system that can regulate, change, or otherwise convert a first power received at the input to a second, different power, provided to the output, in order to provide a constant output voltage. In a non-limiting example, the voltage regulator can be selected, configured, or operated to supply a non-zero voltage and current, such as a 5 V output at 5 milliAmps. While the voltage regulator 280 is powered, voltage is applied across a capacitor 281 in parallel to the voltage regulator 280. Current flows through a resistor 284. The capacitor 281 and the resistor 284 regulate the voltage and current to an optocoupler 282. The optocoupler 282 then drains the voltage to the "gate" control of FET 278 such that FET 278 is closed; closing the current drain 270.

The current drain 270 control feature drains the charge of the upper and lower capacitor banks 220, 230. When the contactor is off, the voltage regulator 280 also switches off. Once the voltage regulator 280 is off, the FET 278 receives voltage (positive from the neutral line 204 and negative from the lower capacitor bank 230) which activates it. The FET 278, when active, supplies current to a series of optocouplers 271 and 272. Resistor 304, in series with optocoupler 271, can be selected to ensure the current is at the correct input value according to the requirements of the optocoupler 271. Current from optocouplers 271 and 272 deactivates FETs 252 and 254 of the MOSFET bypass 250 to close, resetting the current-limiting surge suppressor 240 as the only path to provide surge suppression in the next operation cycle.

When the FET 278 is activated, it also allows the circuit 201 to drain. Current flowing to the drain is dissipated using a high power resistor 306. The resistor 306 can balance discharging at a reasonable rate (fast as possible) and the power required to pass high current to discharge at that rate. This allows the circuit 201 to drain charge stored by the upper or lower capacitor banks 220, 230. Stored charge can drain from the positive of the upper capacitor bank 220 to the negative of the lower capacitor bank 230. During this process, resistor 308 prevents too much current from overwhelming the Zener diode 274 as the circuit discharges. The Zener diode 274 limits the voltage to the FET 278. A capacitor 310 can be optional and helps to hold the Zener diode 274 open longer by providing appropriate voltage, so that the upper and lower capacitor banks 220, 230 can discharge stored charge to zero or near-zero voltage. In one aspect of the present disclosure, after the power is removed (e.g. by opening the contactor), the voltage can reach a "safe" level (e.g. less than 24 VDC) in about 32 seconds.

The circuit 201 further resets as the voltage drops below 80V, FET 278 in the current drain 270 is permitted to turn on.

Figure 4:
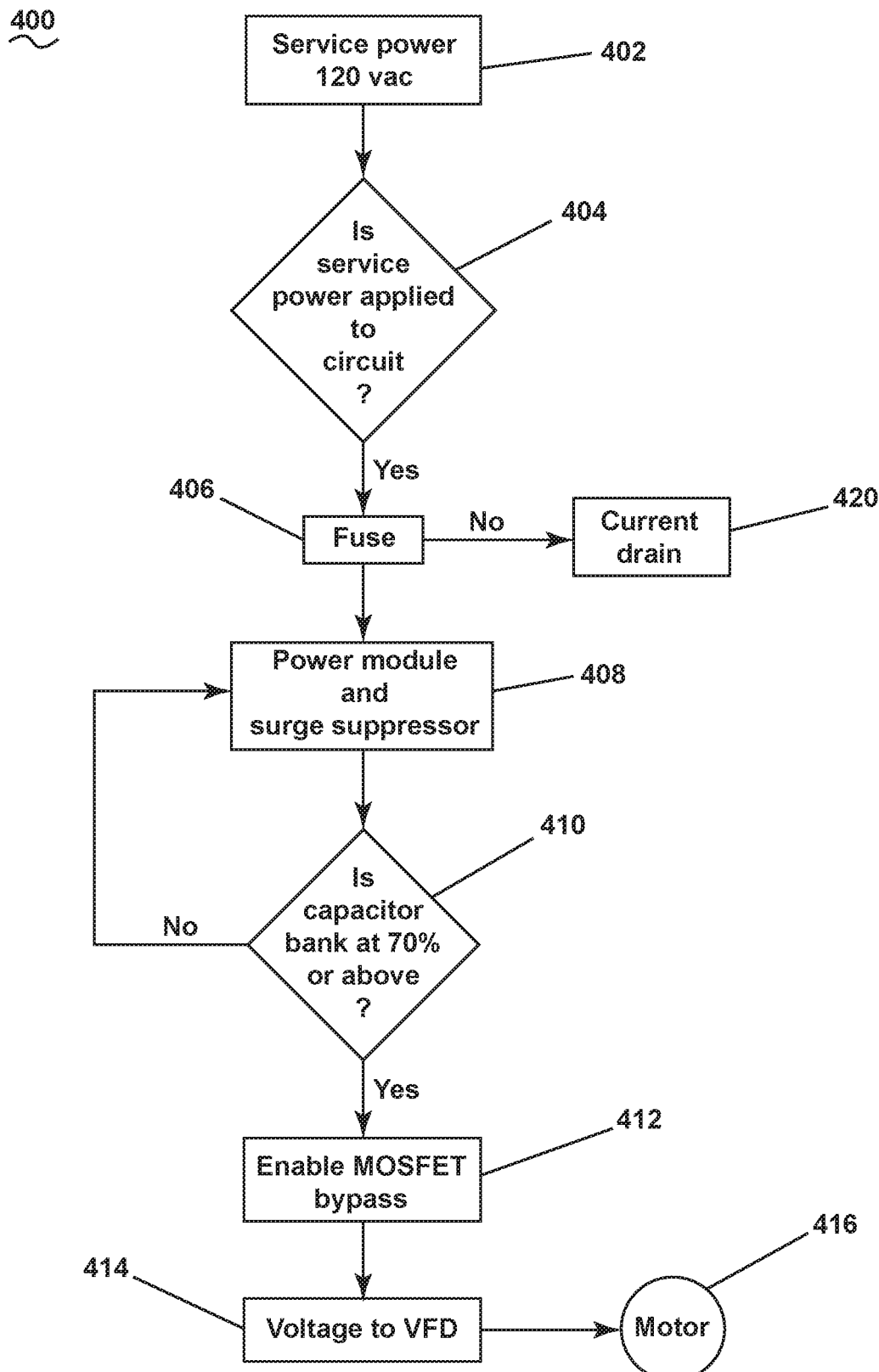
FIG. 4 is a schematic flow chart showing operation of the voltage doubling circuit of FIG. 3.

FIG. 4 illustrates a flow chart representative of current flow 400 during operation of the circuit 201. First, service power, such as 120 VAC, is supplied by the 120 input voltage source 203, at 402. At 404, the circuit 201 can operate in distinct fashions, depending on whether the service power is applied to the circuit 201, such as if the contactor is open or closed. If service power is not applied to the circuit ("NO" branch of 404), the current drain 270 control feature is operated to effectively enable the discharging or draining of the capacitor banks 220, 230, as described herein, at 420. If service power is applied to the circuit 201

("YES" branch of 404, current flows through the fuse 406. Current then flows simultaneously to the voltage regulator 280, the current-limiting surge suppressor 240, and the power module 207, at 408. During this period of time, the upper and lower capacitor banks 220, 230 of the power module 207 begin to charge, as described herein.

The circuit 201 continues to charge the upper and lower capacitor banks 220, 230 via the current-limiting surge suppressor 240. The positive half wave of the 120 VAC input voltage source 203 (also known as an AC power source) can charge the upper capacitor bank 220 while the negative half wave of the 120 VAC input voltage source 203 can charge the lower capacitor bank 230. At 410, if the upper and lower capacitor banks 220, 230 are not charged to 70% of their capacitance ("NO" branch of 410), the circuit 201 will continue to charge the upper and lower capacitor banks 220, 230 of the power module 207 with the current-limiting surge suppressor 240, as described herein. In this non-limiting example, the current-limiting surge suppressor 240 can be configured or adapted to provide current limiting protection up to or beyond 70% of the upper capacitor bank 220 capacitance. Once the upper capacitor bank 220 reaches a charge of 70% of their capacitance ("YES" branch of 410), current flows through Zener diode 294, charging capacitors 256 and 258 which enables the MOSFET bypass 250, in 412. The MOSFET bypass 250 performs as an extremely efficient switch and allows current to flow through the power module 207 and complete charging the upper and lower capacitor banks 220, 230 with less input resistance, compared with when the current-limiting surge suppressor 240 is enabled.

In 414, the upper bank of capacitors 220 contributes to an increase in the positive portion of the original AC signal from the 120 VAC input voltage source 203. A half wave cycle later (that can be, but is not limited to 8 ms) in the AC signal, the lower bank of capacitors 230 triggers an increase in the negative portion of the original 120 VAC input voltage source 203. Combining the 120 VAC input voltage source 203 and capacitor voltage from the upper and lower capacitor banks 220, 230 allows for a DC output voltage greater than 120V to the VFD 200. The upper and lower capacitor banks 220, 230 can charge up to approximately 340 VDC; double the 170 VAC peak voltage of the 120 VAC input voltage source 203. The VFD 200 usually changes VAC to VDC using diodes, so a DC rather than AC input provides no issue for the VFD 200. In a non-limiting example, a minimum voltage required for the VFD 200 to operate can be 240 VDC. Additionally or alternatively, the current from the circuit 201 can directly connect to DC input terminals of the VFD 200; bypassing the diodes and the power that would normally be used to change VAC to VDC.

In 416, current from the VFD 200, can be utilized to operate the motor 88. The upper and lower capacitor banks 220, 230 help maintain the DC output voltage to the VFD 200 at or greater than 240 VDC for a long enough period of time to enable accelerating the drum to a high speed, such as during a spin or water extraction cycle of operation. In one non-limiting example, the high energy storage of the upper and lower capacitor banks 220, 230 are needed to help maintain the DC output voltage to the VFD 200 for a few seconds. In another non-limiting example, the upper and lower capacitor banks 220, 230 can only need to help maintain the DC output voltage to the VFD 200 while the motor 88 is operating with the higher power draw operation, compared with other cycles or sub-cycles of operation. As used herein, a "higher power draw operation" can include a power output draw from the VFD 200 between 100%-200%, for example, when using a 7 Amp VFD. In another non-limiting example when using a higher power VFD, for example a 10 Amp VFD, a "higher power draw operation" can include a power output draw from the VFD 200 of less than 100%. After the highest power draw, greatest acceleration, or combination thereof is over, the voltage doubling operation of the circuit 201 can operate to recharge the upper and lower capacitor banks 220, 230 to maintain a normal DC voltage level up to about 340 VDC.

It will be understood that 404 occurs contemporaneously with 406-416. If at any time the service power applied to the circuit 201 ceases, the current drain 270 can open to discharge the capacitor banks 220, 230, at 420. As explained herein, when the contactor is off, the voltage regulator 280 also switches off, allowing or enabling the current drain 270 to drain in 412.

Figure 5:
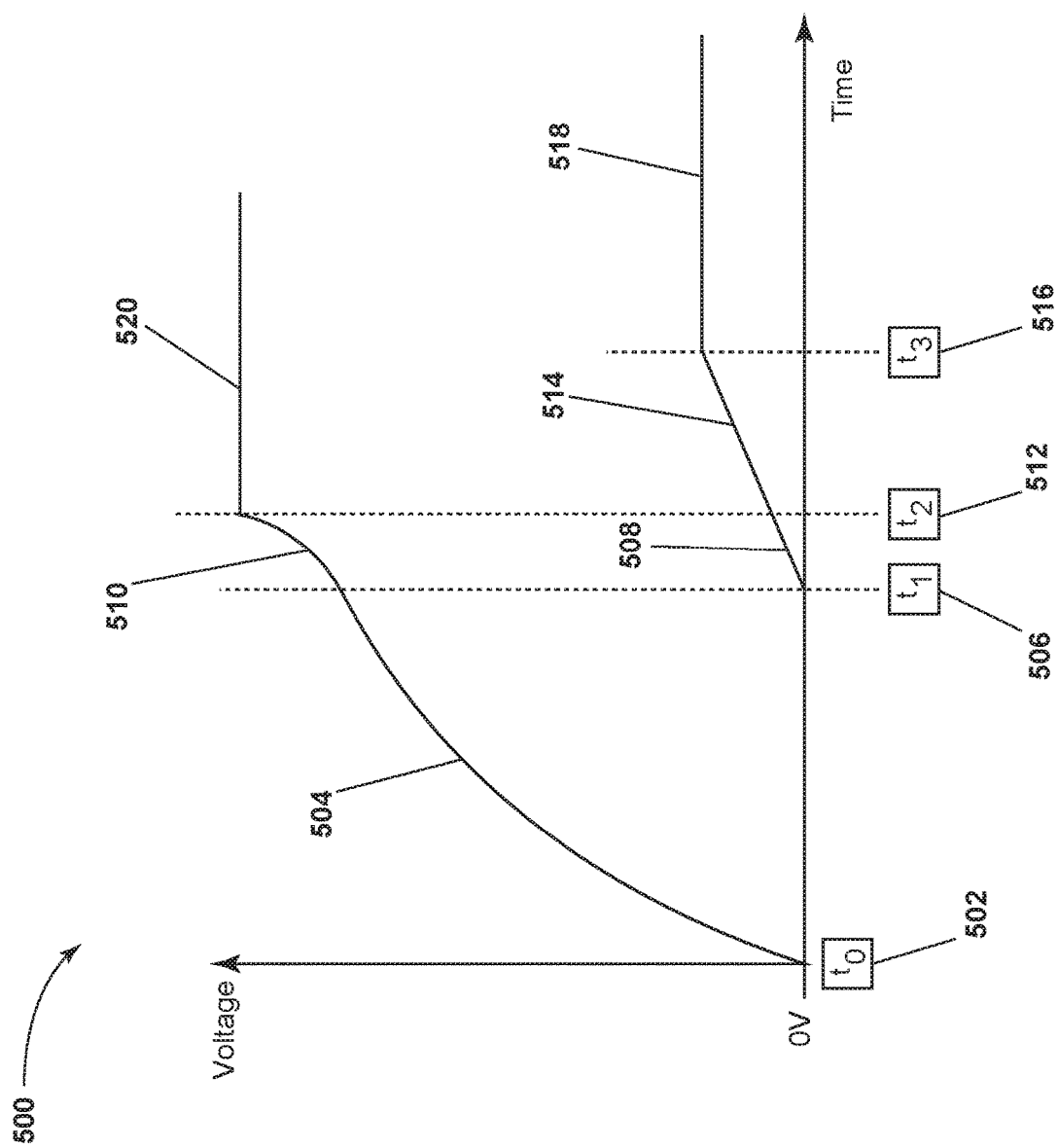
FIG. 5 is a graph that demonstrates voltage verses times of aspects of the voltage doubling circuit in FIG. 3.

FIG. 5 demonstrates a voltage verses time graph 500 for aspects of the circuit 201. Lines 504, 510, 520 are illustrative of the voltage across the upper and lower capacitor bank 220, 230 of circuit 201. Lines 508, 514, 518 are illustrative to the voltage across capacitors 256 and 258.

At time (t0) 502 the 120 VAC input voltage source 203 is supplied to circuit 201 via the contactor. From the time (t0) 502 to a time (t1) 506, the line 504 illustrates the increasing voltage of the upper and lower capacitor banks 220, 230 as current flows through the fuse 206, the power module 207, and the current-limiting surge suppressor 240 to provide increasing charge. The current drain 270 remains closed by the voltage regulator 280 that shorts the FET 278. At the time (t1) 506 the charge on the upper and lower capacitor banks 220, 230 reaches approximately 70% of the total capacitance. At this voltage, current begins to flow through the Zener diode 294. Between the time (t1) 506 and a time (t2) 512, current flowing through the Zener diode 294 charges the capacitors 256 and 258, as shown by line 508. As the capacitors 256 and 258 charge, the input resistance begins to drop as current begins to flow through the MOSFET bypass 250. This enables the upper and lower capacitor banks 220, 230 to continue to charge quickly and completely as shown by line 510 from the time (t1) 506 to the time (t2) 512.

Between the time (t2) 512 and a time (t3) 516, the capacitors 256 and 258 continue to charge as shown by line 514. The MOSFET bypass 250 completely bypasses the current-limiting surge suppressor 240 and the upper and lower capacitor banks 220, 230 are fully charged as illustrated by line 520. At the time (t3) 516 the capacitors 256 and 258 are fully charged as shown by line 518.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Benefits and advantages include, but are not limited to, an ability to supply as much as 340 VDC to a VFD 200. While high output voltage decreases during periods of high current draw, the rate at which the circuit can recharge increases as the output voltage decreases. This allows for a wide variety of aspects of the disclosure to sustain acceptably high voltage output to a variety of applications involving VFDs.

This written description uses examples to disclose aspects of the disclosure, including the best mode, and also to enable any person skilled in the art to practice aspects of the disclosure, including making and using any devices or systems and performing any incorporated methods. While the invention has been specifically described in connection with certain specific aspects thereof, it is to be understood that this is by way of illustration and not of limitation. Reasonable variation and modification are possible within the scope of the forgoing disclosure and drawings without departing from the spirit of the invention which is defined in the appended claims. For example, a relay could be used instead of the MOSFET bypass. Another example could be the use of certain transistors or relays instead of optocouplers. Aspects of this invention could be applied to any VFD device that requires high voltage continuously as well as high power (for example, but not limited to, 750 Watts or more) for a finite length of time during use.

What is claimed is:

1. A home appliance configured to perform a cycle of operation, comprising:
   a motor; and
      a voltage circuit, further comprising:
         a power input configured to receive a voltage supply from a power source;
         at least one capacitor bank connected with the power input;
         a current-limiting surge suppressor positioned between the power input and the at least one capacitor bank that includes a first current-limiting path and a second bypass path, the second bypass path parallel to the first current-limiting path, and wherein the current-limiting surge suppressor is operable in a first mode where the second bypass path is disabled, and operable in a second mode where the second bypass path is enabled, and wherein the current-limiting surge suppressor switches from the first mode to the second mode when the at least one capacitor bank is charged to a predetermined voltage;
         a current drain operable to reset the current-limiting surge suppressor from the second mode to the first mode; and
         a variable frequency drive (VFD) operable in response to a voltage from the at least one capacitor bank greater than the voltage supply from the power source to cause the motor to operate.

2. The home appliance of claim 1 wherein the first mode is a first state of the voltage circuit defined by the at least one capacitor bank being chargeable to the predetermined voltage and wherein the first current-limiting path includes at least one surge resistor.

3. The home appliance of claim 2 wherein the second mode is second state of the voltage circuit defined by the at least one capacitor bank being chargeable via the second bypass path, wherein the second bypass path has less resistance compared with the first current-limiting path.

4. The home appliance of claim 1 wherein the VFD is operable when supplied with the voltage from the at least one capacitor bank that is at least twice the voltage of the voltage supply.

5. The home appliance of claim 4 wherein the voltage supply from the power source is alternating current (AC) and the VFD is operable when supplied with voltage that is direct current (DC).

6. The home appliance of claim 5 wherein the VFD is operable when supplied with from the at least one capacitor bank that is up to 340 Volts direct current (DC).

7. The home appliance of claim 1 wherein the power source is an AC power source, and wherein the at least one capacitor bank includes a first capacitor bank configured to be charged by a positive half wave of the AC power source and a second capacitor bank configured to be charged by a negative half wave of the AC power source.

8. The home appliance of claim 7 wherein the first capacitor bank is in series with the second capacitor bank.

9. The home appliance of claim 1 wherein the second bypass path has a lower resistance compared with the first current-limiting path.

10. The home appliance of claim 1 wherein the predetermined voltage is approximately seventy percent of a peak voltage of the voltage supply.

11. The home appliance of claim 10 wherein the peak voltage of the voltage supply is 170 Volts AC.

12. The home appliance of claim 1 wherein the predetermined voltage is based on the voltage threshold of at least one Zener diode.

13. The home appliance of claim 1 wherein the home appliance is a laundry treating appliance.

14. The home appliance of claim 13 wherein the at least one capacitor bank is at least partially discharged during a high power draw portion of the cycle of operation.

15. The home appliance of claim 14 wherein the high power draw portion of the cycle of operation includes accelerating a drum within a tub.

16. The home appliance of claim 15 wherein the high power draw portion of the cycle of operation includes at least one of a spin cycle or a extraction phase of the cycle of operation.

17. The home appliance of claim 1, further comprising a voltage regulator, wherein the voltage regulator receives an input during the first mode and the second mode of the current-limiting surge suppressor.

18. The home appliance of claim 17, wherein the current drain is operably closed when the voltage regulator receives the input.

19. The home appliance of claim 18, wherein resetting the current-limiting surge suppressor from the second mode to the first mode occurs when the voltage regulator no longer receives the input.

20. The home appliance of claim 1, wherein resetting or disabling of the second bypass path back to the first current-limiting path occurs in response to at least one of completion of the cycle of operation or ceasing supply of power from the power source.

* * * * *